(12) United States Patent
Pickard et al.

(10) Patent No.: US 12,247,731 B2
(45) Date of Patent: Mar. 11, 2025

(54) ARTIFICIAL WINDOW WITH CEILING WASH

(71) Applicant: KORRUS, INC., Los Angeles, CA (US)

(72) Inventors: Paul Kenneth Pickard, Los Angeles, CA (US); Benjamin Harrison, Los Angeles, CA (US); Robert Fletcher, Los Angeles, CA (US); Jessica Morand, Los Angeles, CA (US)

(73) Assignee: KORRUS, INC., Los Angeles, CA (US)

( * ) Notice: Subject to any disclaimer, the term of this patent is extended or adjusted under 35 U.S.C. 154(b) by 0 days.

(21) Appl. No.: 18/377,560

(22) Filed: Oct. 6, 2023

(65) Prior Publication Data

US 2024/0142085 A1    May 2, 2024

Related U.S. Application Data

(60) Provisional application No. 63/413,696, filed on Oct. 6, 2022.

(51) Int. Cl.
| | |
|---|---|
| *F21V 9/02* | (2018.01) |
| *F21S 8/00* | (2006.01) |
| *F21S 10/00* | (2006.01) |
| *F21S 10/02* | (2006.01) |
| *F21V 33/00* | (2006.01) |
| *H05B 47/16* | (2020.01) |
| *H05B 47/17* | (2020.01) |

(52) U.S. Cl.
CPC ............. *F21V 9/02* (2013.01); *F21S 8/006* (2013.01); *F21S 8/033* (2013.01); *F21S 10/005* (2013.01); *F21S 10/023* (2013.01); *H05B 47/16* (2020.01); *H05B 47/17* (2020.01); *F21V 33/0016* (2013.01)

(58) Field of Classification Search
CPC .......... F21V 9/02; F21V 33/0016; E06B 7/28; F21S 8/006; F21S 8/033; F21S 10/023; F21S 10/055
See application file for complete search history.

(56) References Cited

FOREIGN PATENT DOCUMENTS

| CN | 111102498 A | * | 5/2020 | ................ F21S 8/00 |
| EP | 1371897 A1 | * | 12/2003 | ............ B44C 5/005 |
| KR | 20120029740 A | * | 3/2012 | |

\* cited by examiner

*Primary Examiner* — Mariceli Santiago
(74) *Attorney, Agent, or Firm* — FisherBroyles LLP

(57) ABSTRACT

An artificial sunlight system for wall installation comprising: one or more modules, each module comprising at least the following, (a) a frame configured to be installed on a wall; (b) at least one panel supported by said frame, said panel having first and second ends and an emission surface for emitting panel light, and said panel being configured to emit said panel light away from said wall when said frame is installed on said wall; and (c) at least one ceiling light emitter supported by said frame, said ceiling light emitter being configured to emit ceiling light upward toward a ceiling when said frame is installed on said wall.

19 Claims, 6 Drawing Sheets

Region - 1:
Region within -
- Spectral locus between monochromatic points 420nm and 490nm
- Line connecting monochromatic point at 460nm and CCT 5000k on Planckian locus
- Line connecting monochromatic point at 490nm and CCT 5000k on Planckian locus Region - 2:
Region within -
- Spectral locus between monochromatic points 580nm and 610nm
- Line connecting monochromatic point at 580nm and CCT 3000k on Planckian locus
- Line connecting monochromatic point at 610nm and CCT 5000k on Planckian locus Region - 3:
Region within -
- Constant CCT line of 4000K
- Constant CCT line of 8000K
- Duv +/- 20 points between 4000K and 8000K

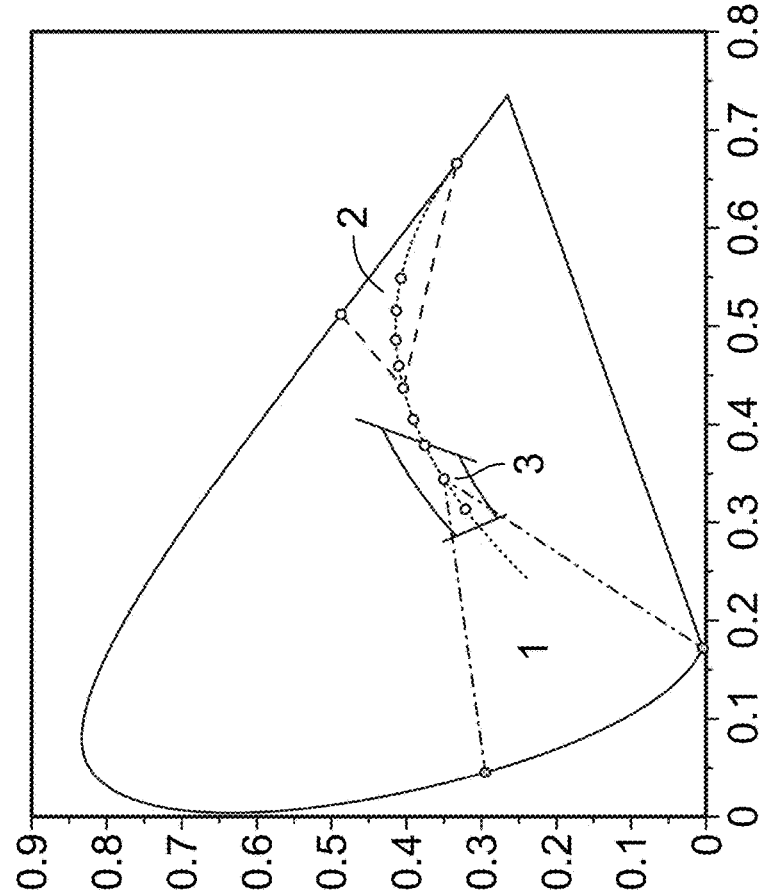

FIG. 3

ARTIFICIAL WINDOW WITH CEILING WASH

CROSS REFERENCE TO RELATED APPLICATIONS

The present patent application claims the benefit of U.S. Provisional Patent Application 63/413,696, filed Oct. 6, 2022, the entire disclosure of which is hereby incorporated herein by reference.

FIELD OF INVENTION

The present invention is directed generally to an artificial window, and, more specifically, to a light panel with ceiling wash for biological and psychological impact.

BACKGROUND

With a greater proportion of professionals working from home, an expected construction trend over the coming years is the conversion of commercial office space to lofts, condos and apartments. There is a substantial shortage of homes (single family and otherwise) in many parts of the country, leading to ever-increasing rents and upward pressure on existing home values.

Converting newly vacant office space to living accommodations can help offset that shortfall. However, many commercial buildings are not constructed in a fashion that allows for ample natural light for interior spaces. For example, in some areas it is required that bedrooms have a window, but not other rooms. Consequently, floor plans exist where the living space is entirely isolated from natural light except for that making its way through the bedroom. As such, there is a need for lighting appliances that can provide for the biological needs of occupants (adequate vertical Melanopic Lux during the day, primarily) that would otherwise be achieved with natural light through windows. (Even in multifamily dwelling with windows in every room, certain geographies with tendencies for consistent overcast skies could also benefit from such appliances.)

In addition to providing the appropriate amount of light and the appropriate spectra, these appliances also have the potential to provide psychological cues to the occupants as to time of day and beauty to improve interior aesthetics and improve occupant ease and wellness.

Luminous panels akin to those used in ceiling lighting fixtures have been repurposed for vertical mounting with the trappings of a window to provide visual cues to the intended function of such panels. Unfortunately, these panels look nothing like windows, but rather like glowing light fixtures set into the wall because of their stark white uniform appearance. Accordingly, Applicant recognizes the need for a luminous or light panel that more realistically mimics natural sunlight through a window. The present invention fulfills this need, among others.

SUMMARY OF INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

Broadly, this invention relates to a luminous surface combined with an additional source to wash the ceiling with light. The ceiling wash creates the illusion of a sky, and, in one embodiment, delivers circadian stimulation. In one particular embodiment, the luminous surface is embellished with decorations intended to make it resemble a window.

In one embodiment, the invention relates to an artificial sunlight system for wall installation comprising: one or more modules, each module comprising at least the following, a frame configured to be installed on a wall; at least one panel supported by the frame, the panel having first and second ends and an emission surface for emitting panel light, and the panel being configured to emit the panel light away from the wall when the frame is installed on the wall; and at least one ceiling light emitter supported by the frame, the ceiling light emitter being configured to emit ceiling light upward toward a ceiling when the frame is installed on the wall

BRIEF DESCRIPTION OF FIGURES

FIGS. 3 and 6 show embodiments of the chromaticity regions of the first and second colors of the present invention.

DETAILED DESCRIPTION

Figure 1:
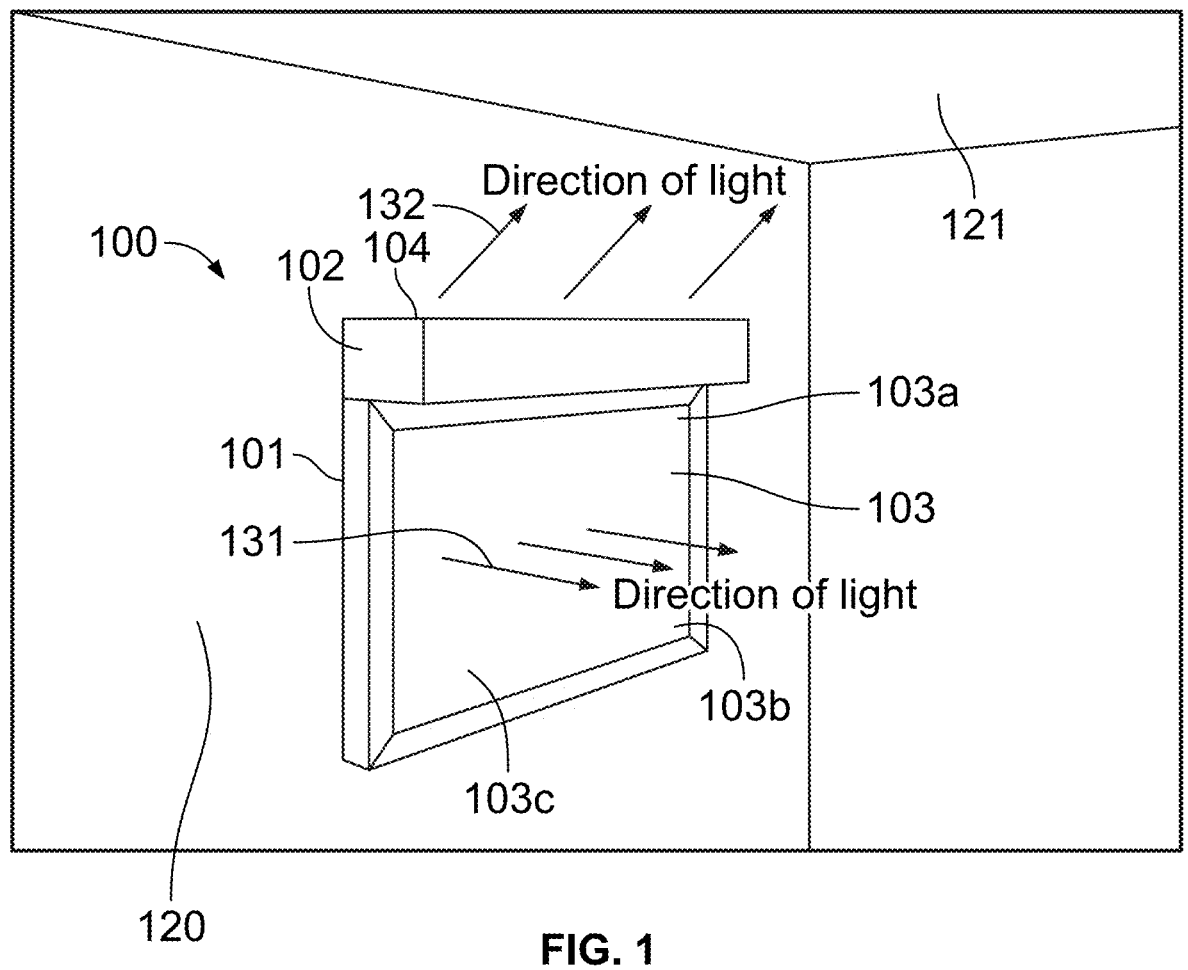
FIG. 1 shows one embodiment of a module of the artificial sunlight system of the present invention.

Referring to FIG. 1, one embodiment of a module 101 of the artificial sunlight system 100 of the present invention is shown. In this embodiment, the artificial sunlight system comprises one or more modules 101, each module 101 comprising at least the following, a frame 102 configured to be installed on a wall 120; at least one panel 103 supported by the frame, the panel having first and second ends 103a, 103b, and an emission surface 103c for emitting panel light 131, and the panel being configured to emit the panel light away from the wall when the frame is installed on the wall; and at least one ceiling light emitter 104 supported by the frame, the ceiling light emitter being configured to emit ceiling light 132 upward toward a ceiling 121 when the frame is installed on the wall. Each of these features are described below in greater detail and with respect to selected embodiments.

In one embodiment, the panel light and the ceiling light are configured to mimic sunlight, in which the ceiling light emulates the overhead sky, while the panel light emulates the light from the horizon up to the overhead sky. To that end, in one embodiment, the panel light and the ceiling light are different in at least spectrum and/or intensity Generally, although not necessarily, the ceiling light is controlled to simulate the overhead sky. According, the ceiling light may have various embodiments. In one embodiment, the ceiling light is uniform. In another embodiment, the ceiling light displays different images (e.g., stars, clouds, multiple moving colors, etc.). In one embodiment, the ceiling light transitions among violet/blue, pale blue, and total darkness (i.e., off) to simulate the overhead sky.

The panel light is generally, but not necessarily, controlled to simulate light from the horizon upward. In this regard, in one embodiment, the first end of the panel is the top end and the second end of the panel is the bottom end when the frame is installed on the wall. Accordingly, in one embodiment, the panel light is configured in one or more of the following ways: to be uniform; and/or to have a gradient in color and/or a gradient of intensity between the first and second ends; and/or to be patterned; and/or to dynamically display images (e.g., clouds, stars, mountains, sea, animations, etc.).

In one embodiment, the panel light emits a color gradient between a first end light and a second end light that emulates natural sunlight through a window. Applicant discovered a surprisingly effective and simple approach for emulating natural sunlight through a window by introducing gradient color in light panels to provide a more pleasing aesthetic and a more convincing "artificial window" than can be provided by a uniform luminous panel.

In one embodiment, the first end light and the second end light are configured in at least a first mode and a second mode to emulate light during different times of the day. In one embodiment, the first end light and the second end light source are configured in at least a first mode, wherein the first end light is pale blue at a first intensity, and the second end light is cool white to emulate natural sunlight during the day. In one embodiment, the first end light and the second end light are configured in a second mode, wherein the first light is pale blue at a second intensity or violet/blue, and the second light is orange/amber to emulate light during dawn and sunset. In one embodiment, the first intensity is greater than the second intensity.

In one embodiment, the color of the panel changes throughout the day to emulate the sky as it changes throughout the day. For example, in an embodiment in which midday is represented by a first mode, and dawn and dusk are represented by the second mode, the light panel can be configured to transition between the second mode in the morning to the first mode midday, and back to the second mode at dusk, before going dark. For example, in one particular embodiment, during the course of a day, the top light source transitions from violet/blue to pale blue to violet/blue and finally to off, and the bottom light source transitions from orange/amber to cool white to orange/amber and finally to off.

Figure 2A:
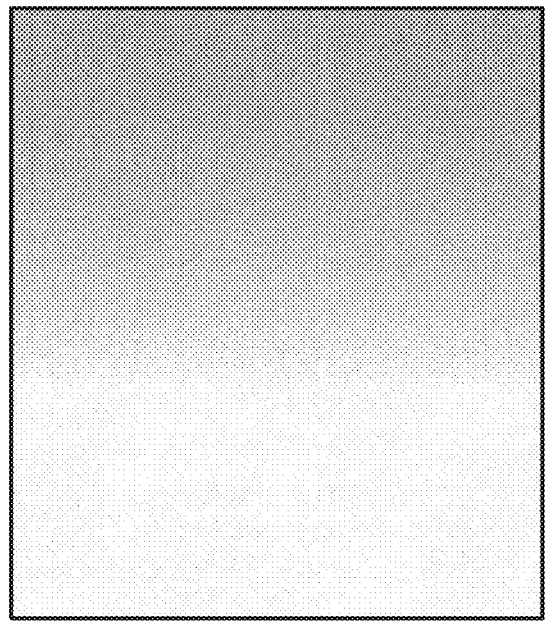
FIGS. 2A and 2B show different color modes of the light panel of one embodiment of the present invention.
Figure 2B:
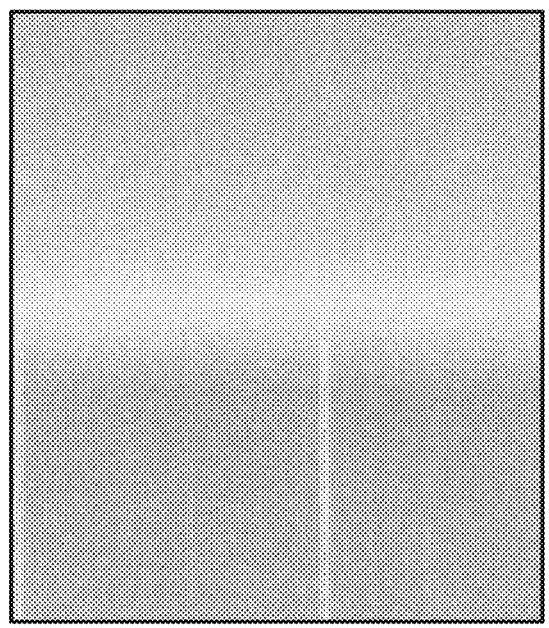

For example, referring to FIGS. 2(A) and 2(B), an embodiment is shown having different color gradient modes. In FIG. 2(A) (a daytime view) a pale blue light is the first or top end light, while a full-spectrum cool white light is the second or bottom end light. This configuration provides a view like a translucent glass pane might when facing a sunny exterior scene with a clear view of the horizon.

In FIG. 2(B), a pale blue and a high color rendering 1800K light are used as the first and second end lights respectively. In this instance, the blue intensity is reduced such that the hue appears to shift darker as would be expected at sunrise or sunset. In this configuration, a violet light may be used in combination with the pale blue source to provide a more convincing shift into the night sky. Additionally, in one embodiment, Applicant suspects that adding a violet component to the "morning sky" may align a user's circadian rhythm and make the user more receptive to high blue/high circadian stimulation later in the day.

Figure 6:
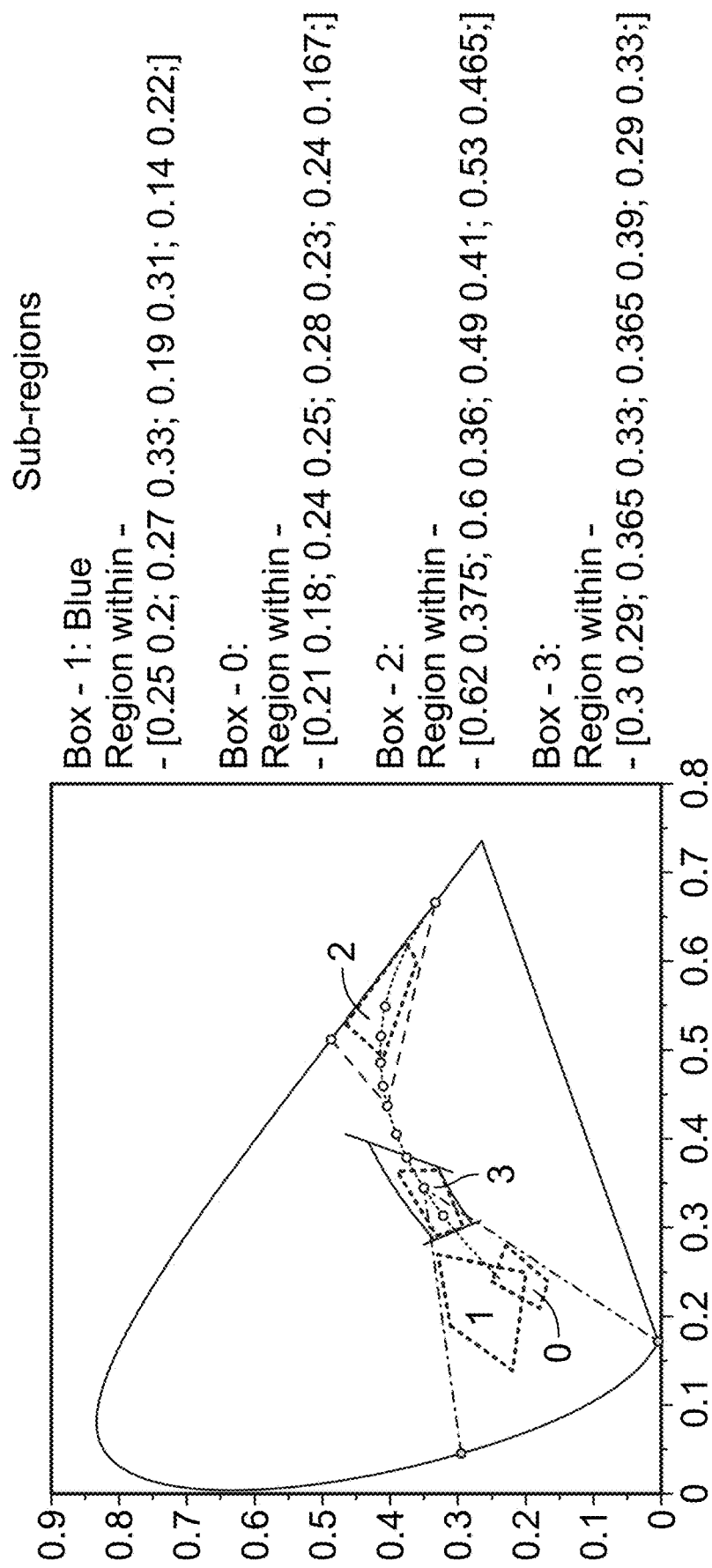

In one embodiment, pale blue and violet/blue are defined as within Region 1 in FIG. 3, and, more particularly, pale blue is defined as Region 1 in FIG. 6 and violet/blue is defined as Region 0 in FIG. 6. In one embodiment, cool white is defined as Region 3 in FIG. 3, and, more particularly, as Region 3 in FIG. 6. In one embodiment, orange/amber is defined as Region 2 in FIG. 3, and, more particularly as Region 2 in FIG. 6.

In one embodiment, the panel light and ceiling light are coordinated to produce synergistic results. For example, several different color systems can be used to accomplish these effects, some of which will have greater impacts on the Circadian system than others. In one embodiment, the panel light source and the ceiling light emitter operate in at least a high circadian stimulation (CS) mode and a low CS mode. In one body, in the high CS mode, the ceiling light is a high CS blue and the panel light has a color gradient from pale blue to white from the first end to the second end. In one embodiment, in the low CS mode, the ceiling light is off, and the panel light is a dim, warm, low CS light emitted only at the second end.

In one embodiment, the panel light emits a color gradient between the first and second ends, wherein during the course of a day, the panel light at the first end transitions from violet/blue to pale blue to violet/blue and finally to off, and the panel light at the second end transitions from orange/amber to cool white to orange/amber and finally to off. In this embodiment, during the course of a day, the ceiling light transitions from violet/blue to pale blue to violet/blue and finally to off.

To enhance the realism of the artificial sunlight system, in one embodiment, the system comprises coordinating multiple panels and/or modules. For example, in one embodiment, multiple modules are synchronized to emulate multiple windows in a room. In such an embodiment, it may be preferable to independently control the different modules. For example, in one embodiment, each of the modules is configurable to specify the orientation of the module in the room (e.g., north, south, east or west), thereby facilitating independent and different control of each module according to its orientation. For example, modules having different orientation may, in one embodiment, vary in color and/or intensity (e.g., a panel mounted on a north wall will have lower intensity compared to a panel mounted on a southern facing wall).

In another embodiment, the module may comprise multiple panels. That is, although the module 101 shown in FIG. 1 is configured with a single panel, in other embodiments the module may comprise two or more panels. For example, in one embodiment, the module may comprise multiple panels arranged as windowpanes. In such an embodiment, multiple panels within a module are synchronized to pass the color gradient from one to the next to make a big continuous gradient. In another embodiment, multiple panels are synchronized to show the same effect across all the panels. Still other embodiments will be obvious to those of skill in the art in light of this disclosure.

Figure 5:
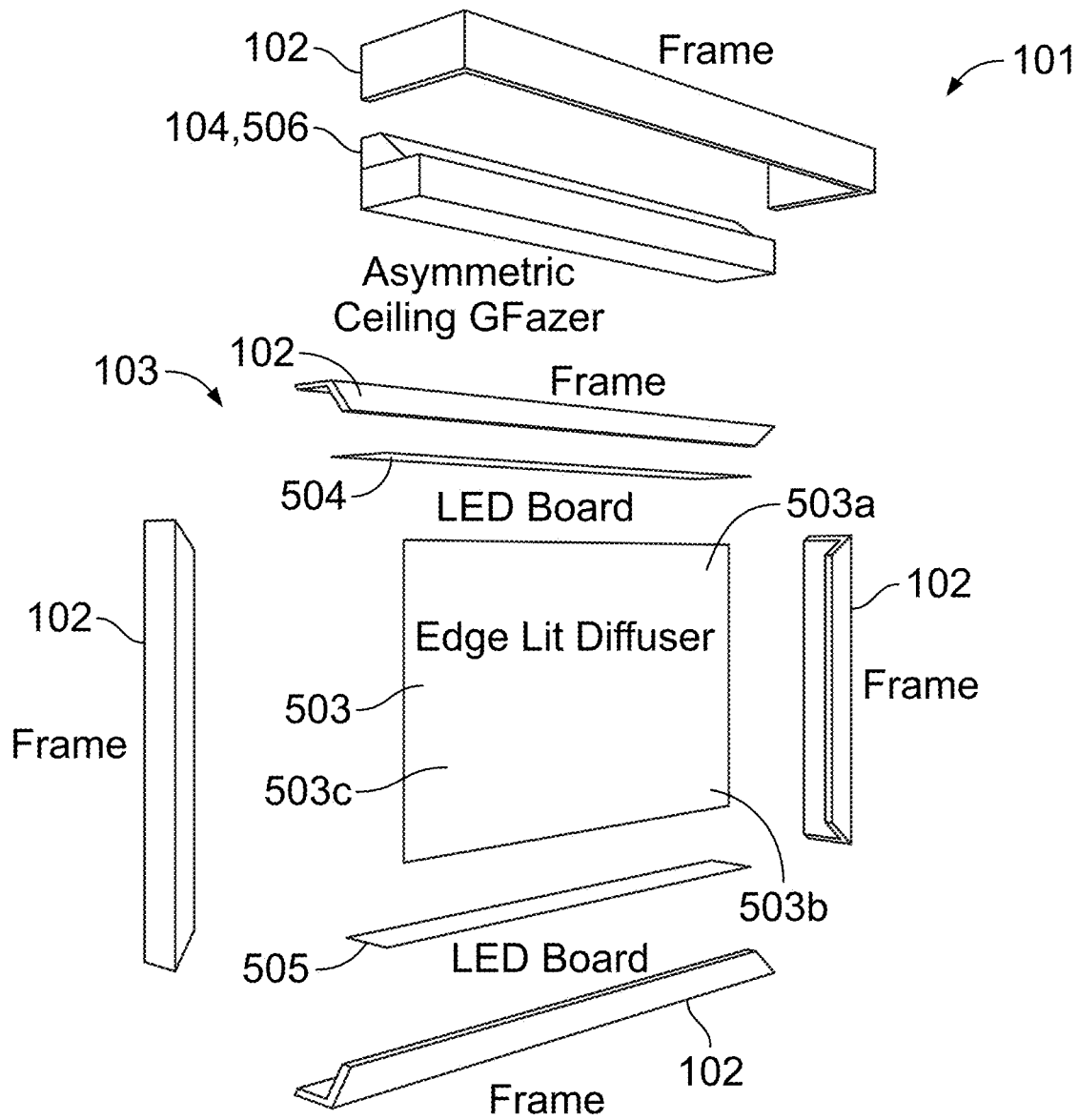
FIG. 5 shows an exploded view of the embodiment of FIG. 1.

Referring to FIG. 5, an exploded view of the module 101 of the system 100 of FIG. 1 is shown. As shown, the module 101 comprises at least the following: a frame 102 configured to be installed on a wall, at least one panel 103 supported by the frame. In this embodiment, the panel 103 comprises a lightguide 503 having first and second ends 503a, 503b and an emission surface 503c. In this embodiment, the panel 103 also comprises first and second LED boards 504, 505 respectively, which are optically coupled to the first and seconds ends of lightguide 503. The module 101 also comprises at least one ceiling light emitter 104 supported by the frame. In this embodiment, the ceiling light emitter 104 is an asymmetrical ceiling lens 506. In this embodiment, the first LED board 504 couples light not only to the lightguide 503, but also to the asymmetrical ceiling lens 506.

Figures 4A, 4B:
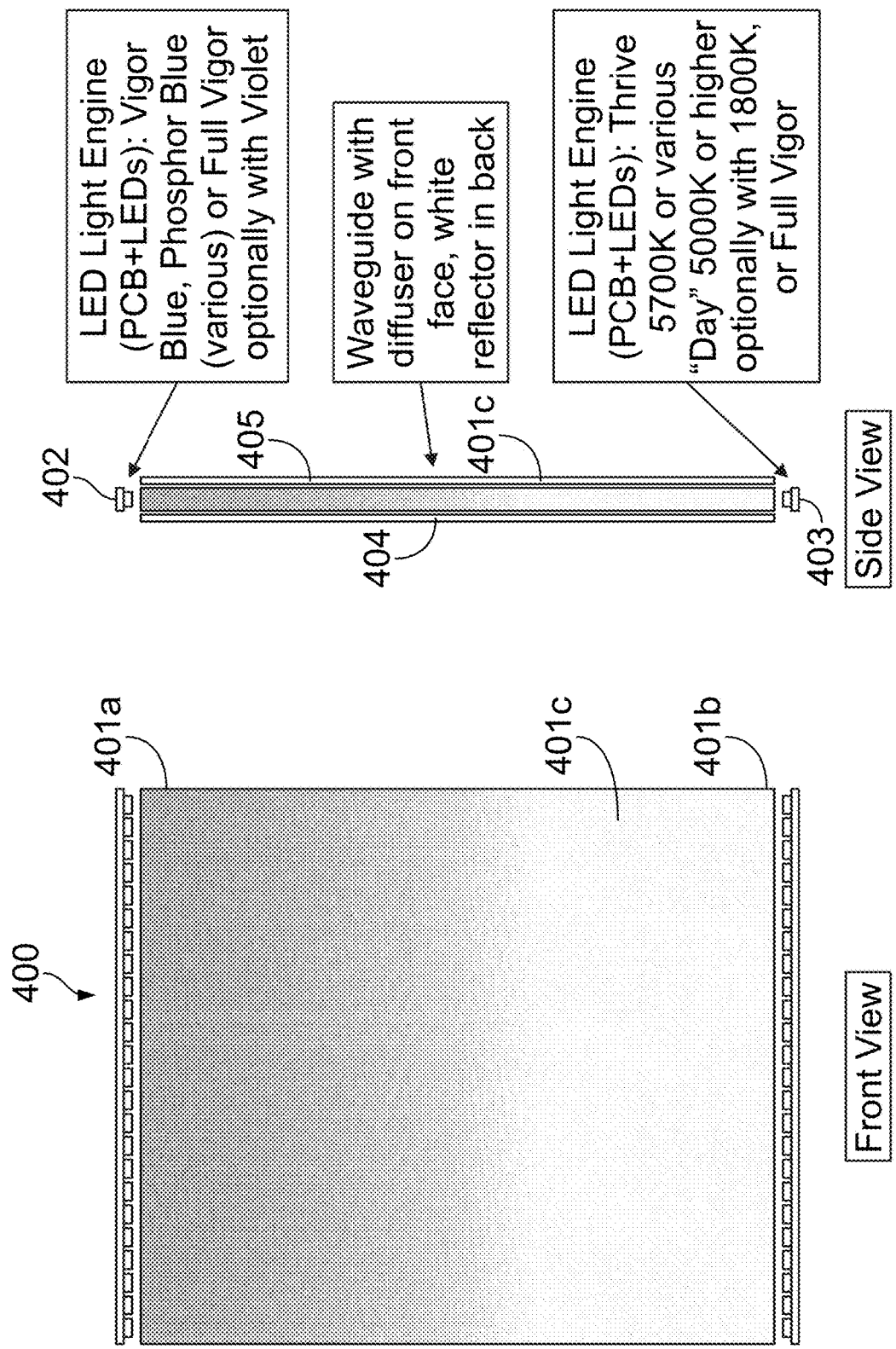
FIGS. 4A and 4B show front and side views of a schematic of one embodiment of the light panel of the present invention.

Referring to FIGS. 4A and 4B, a more particular embodiment of the light panel 400 of the present invention is shown. In this embodiment, the light panel 400 comprises (a) a planar waveguide 401 having a top 404A, a bottom 404B, and an emission surface 401c for emitting emitted light, and (b) at least two light sources, a first light source 402 configured to emit a first light and being optically coupled to the top of the planar waveguide, and a second end light 403 configured to emit a second light and being optically coupled to the bottom of the planar waveguide. The emitted light is the first light at the top and the second light at the bottom with a light gradient from the first light to second light between the top and the bottom.

The waveguide may comprise any known material for conducting light including, for example, glass and optically transparent polymeric materials. Additionally, the waveguide may comprise light extraction features which cause the light being conducted by the waveguide to be emitted from the waveguide through the emission surface. Such light extraction features are well known. In the embodiment of FIG. 4B, waveguide 401 also comprises a diffuser 405 on emission surface 401c, and a reflector 404 on the backside of the waveguide.

The waveguide may have any shape or configuration. For example, it may resemble a traditional window and be, for example, rectangular or square, or it may resemble a porthole and be, for example, round or oval. Other shapes include, for example, any polygon, stars, symbols, characters, etc. In one embodiment, the waveguide is planar, although it may be curved or even 3-dimentional (e.g., multifaceted, cylindrical, or spherical). Still other embodiments will be obvious to those of skill in the art in light of this disclosure.

Although the embodiment of FIG. 4A introduces light at the top and bottom of the waveguide, it should be understood that other embodiments are possible. For example, in one embodiment, light is introduced at the sides of the waveguide. (In this respect, it should be understood that top and bottom are relative terms, and that the light panel may simply be turned sideways such that the top and bottom of the waveguide become the sides.) In another embodiment, light is introduced along all edges of the waveguide (e.g., top, bottom, and sides). In yet another embodiment, light is introduced only along one edge and light converting materials, such as phosphors, or other light converting features are selectively disposed in the waveguide to convert the introduced light (e.g., blue light) to a different color (e.g., white light) to create a color gradient. Still other embodiments will be obvious to those of skill in the art in light of this disclosure.

Approaches for driving the light sources can vary from simple to complex. For example, in a simple embodiment, the light panel has a single driver for driving the first and second light sources. For example, in a simple embodiment, just one driver is used along with a splitter for providing power to the first and second light sources. For example, in an on/off or dim-only configuration, both of these LED strings could be driven together or with some minor current dividing circuit in place to minimize the electronic complexity. In one embodiment, the at least one driver comprises simple dimming functionality to change the intensity of at least one of the first or second light sources without changing color. In another embodiment, switching from first and second modes is done without transition and simply involves switching between different settings in the driver In more complex embodiments, multiple drivers are used to drive and transition the top and bottom light sources from the first mode to the second mode. The transition may vary. For example, in one embodiment, the transition involves incremental color changes. In another embodiment, the transition is continuous, without discernible a step change differences in color changes. For example, in one embodiment, the color of the top light source is configured to vary from pale blue to violet/blue, and the color of the bottom light source is configured to vary from cool white to orange/amber. In one embodiment, variation of light color is controlled by a dimmer, or a timer synced to an astronomical clock. In one embodiment, the transition of the top and bottom light sources is controlled through a smart phone application, an on-fixture dimmer, a wall dimmer, or a timer synched to the date/time. In more complex embodiments, at least two drivers are used such that the first and second light sources have dedicated drivers. In one embodiment, the at least one driver comprises a plurality of drivers configured to independently vary at least the color or the intensity of the top and bottom light sources.

Although FIG. 4A shows two light bars in which all the individual light sources (e.g., LEDs) operate in unison, other embodiments exist. For example, in one embodiment, the individual light sources are individually addressable allowing individual light sources to be driven individually to have different colors. Thus, rather than creating a color gradient by mixing the first and second colors in the waveguide as described above, a color gradient can be created along the light source. Such an embodiment is more complex, but may be preferable to control the light gradient more precisely. Such an embodiment also may be preferred if the panel is illumined from the sides as described above.

The light sources vary in configuration. For example, in one embodiment, the first and second light sources are light bars. Other embodiments may include, for example, discrete LEDs disposed on the top and bottom edges of the light guide. In one embodiment, the individual light sources are independently addressable as described above. In still another embodiment, the panel comprises a display having pixels which are individually addressable. Such displays are known and include, for example, backlit displays and emissive displays. Still other embodiments will be obvious by those of skill in the art in light of this disclosure.

The light sources for producing the colors as described above are commercially available. In one embodiment, the top light source is selected from the group consisting of Vigor Blue, Nichia phosphor converted Cyan or equivalent, Lumileds phosphor converted Blue, Full Vigor system, and any of the above with additional violet light. Still other light options will be obvious to those of skill the art in light of the disclosure.

In one embodiment, the bottom light source is selected from the group consisting of the Full Vigor System, 5700K Bridgelux Thrive, 5000K Samsung "Day", 5000K Lumileds "Day", and any of the above+1800K high CRI white for sunrise/sunset modes. Still other light options will be obvious to those of skill the art in light of the disclosure.

Regarding the ceiling light emitter, in one embodiment, it is an asymmetrical lens 506 as shown in FIG. 5. It should be understood, however, that other embodiments are possible. For example, rather than the ceiling light emitter being a lens coupled to a light source of the panel, it might be a discrete light. Such an embodiment may be preferred if the ceiling light is to be independent of the first end light of the panel. In another embodiment, the ceiling light emitter is a discrete projector to project imagery onto the ceiling. As mentioned above, such imagery may include, for example, clouds, flowing colors, stars, etc.

The physical installation of the module on the wall can vary according to application. In one embodiment, as shown in FIG. 1, the module 101 is a unitary component configured for hanging on a wall. Such embodiment, after hanging, then can be enhanced by window treatments or other features to emulate a window. Alternatively, in one embodiment, the module of the light system is integral to the wall. Again, in such an environment, the module can be augmented with window treatments and other features to enhance its appearance as a window. Still other embodiments will be obvious to those of skill in the art in light of this disclosure.

These and other advantages maybe realized in accordance with the specific embodiments described as well as other variations. It is to be understood that the above description is intended to be illustrative, and not restrictive. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled.

What is claimed is:

1. An artificial sunlight system for wall installation comprising:
    one or more modules, each module comprising at least the following,
        a frame configured to be installed on a wall;
        at least one panel supported by said frame, said panel having first and second ends and an emission surface for emitting panel light, and said panel being configured to emit said panel light away from said wall when said frame is installed on said wall; and
        at least one ceiling light emitter supported by said frame, said ceiling light emitter being configured to emit ceiling light upward toward a ceiling when said frame is installed on said wall;
        wherein said ceiling light emitter is a projector for displaying images.

2. An artificial sunlight system for wall installation comprising:
    one or more modules, each module comprising at least the following,
        a frame configured to be installed on a wall;
        at least one panel supported by said frame, said panel having first and second ends and an emission surface for emitting panel light, and said panel being configured to emit said panel light away from said wall when said frame is installed on said wall; and
        at least one ceiling light emitter supported by said frame, said ceiling light emitter being configured to emit ceiling light upward toward a ceiling when said frame is installed on said wall;
        wherein panel light source and said ceiling light emitter operate in at least a high circadian stimulation (CS) mode and a low CS mode.

3. The artificial sunlight system of claim 2, wherein said panel light and said ceiling light are different in at least spectrum or intensity.

4. The artificial sunlight system of claim 2, wherein said ceiling light is uniform.

5. The artificial sunlight system of claim 2, wherein said panel light is configured in one or more of the following ways: to be uniform; to have a gradient in color, to have a gradient of intensity; to be patterned; or to dynamically display images.

6. The artificial sunlight system of claim 2, wherein said first end is the top and said second end is at the bottom when said frame is installed in said wall.

7. The artificial sunlight system of claim 2, wherein one or more modules comprises multiple modules, wherein said multiple modules are synchronized to emulate multiple windows in a room.

8. The artificial sunlight system of claim 2, wherein said panel light and said ceiling light vary between different spectrum and/or intensity modes, and wherein the transition between said modes is controlled by a dimmer or a timer synced to an astronomical clock.

9. The artificial sunlight system of claim 2, wherein said panel light and said ceiling light vary between different spectrum and/or intensity modes, and wherein the transition of the panel light and the ceiling light between modes is controlled through an application, an on-fixture dimmer, a wall dimmer, or a timer synched to the date/time.

10. An artificial sunlight system for wall installation comprising:
    one or more modules, each module comprising at least the following,
        a frame configured to be installed on a wall;
        at least one panel supported by said frame, said panel having first and second ends and an emission surface for emitting panel light, and said panel being configured to emit said panel light away from said wall when said frame is installed on said wall; and
        at least one ceiling light emitter supported by said frame, said ceiling light emitter being configured to emit ceiling light upward toward a ceiling when said frame is installed on said wall;
        wherein said first end is the top and said second end is at the bottom when said frame is installed in said wall;
        wherein panel light source and said ceiling light emitter operate in at least a high circadian stimulation (CS) mode and a low CS mode;
        wherein, in said high CS mode, said ceiling light is a high CS blue and said panel light has a color gradient from pale blue to white from said first end to said second end.

11. An artificial sunlight system for wall installation comprising:
    one or more modules, each module comprising at least the following,
        a frame configured to be installed on a wall;
        at least one panel supported by said frame, said panel having first and second ends and an emission surface for emitting panel light, and said panel being configured to emit said panel light away from said wall when said frame is installed on said wall; and
        at least one ceiling light emitter supported by said frame, said ceiling light emitter being configured to emit ceiling light upward toward a ceiling when said frame is installed on said wall;
        wherein said first end is the top and said second end is at the bottom when said frame is installed in said wall;
        wherein panel light source and said ceiling light emitter operate in at least a high circadian stimulation (CS) mode and a low CS mode;
        wherein, in said low CS mode, the ceiling light is off, and said panel light is a dim, warm, low CS light emitted only at the second end.

12. An artificial sunlight system for wall installation comprising:

one or more modules, each module comprising at least the following,
- a frame configured to be installed on a wall;
- at least one panel supported by said frame, said panel having first and second ends and an emission surface for emitting panel light, and said panel being configured to emit said panel light away from said wall when said frame is installed on said wall; and
- at least one ceiling light emitter supported by said frame, said ceiling light emitter being configured to emit ceiling light upward toward a ceiling when said frame is installed on said wall;
- wherein said first end is the top and said second end is at the bottom when said frame is installed in said wall;
- wherein, said panel light emits a color gradient between said first and second ends wherein the color at the first end is configured to vary from pale blue to violet/blue, and the color at said second end is configured to vary from cool white to orange/amber.

13. The artificial sunlight system of claim 12, wherein, said ceiling light transitions among violet/blue, pale blue, and off.

14. The artificial sunlight system of claim 12,
wherein, said panel light emits a color gradient between said first and second ends, wherein during the course of a day, the panel light at said first end transitions from violet/blue to pale blue to violet/blue and finally to off, and said panel light at said second end transitions from orange/amber to cool white to orange/amber and finally to off.

15. The artificial sunlight system of claim 14, wherein, wherein during the course of a day, said ceiling light transitions from violet/blue to pale blue to violet/blue and finally to off.

16. The artificial sunlight system of claim 12, wherein said panel comprises a first end light source and a second end light source, and a lightguide optically coupled to said first and second end light sources, and configured for emitting light from said emission surface.

17. The artificial sunlight system of claim 16, wherein said first and second end light sources are bar lights.

18. An artificial sunlight system for wall installation comprising:
one or more modules, each module comprising at least the following,
- a frame configured to be installed on a wall;
- at least one panel supported by said frame, said panel having first and second ends and an emission surface for emitting panel light, and said panel being configured to emit said panel light away from said wall when said frame is installed on said wall; and
- at least one ceiling light emitter supported by said frame, said ceiling light emitter being configured to emit ceiling light upward toward a ceiling when said frame is installed on said wall,
- wherein said at least one panel comprises multiple panels arranged as windowpanes, each of said multiple panels being coordinated so light color and/or color gradient is continuous across said multiple panels.

19. An artificial sunlight system for wall installation comprising:
one or more modules, each module comprising at least the following,
- a frame configured to be installed on a wall;
- at least one panel supported by said frame, said panel having first and second ends and an emission surface for emitting panel light, and said panel being configured to emit said panel light away from said wall when said frame is installed on said wall; and
- at least one ceiling light emitter supported by said frame, said ceiling light emitter being configured to emit ceiling light upward toward a ceiling when said frame is installed on said wall;
- wherein one or more modules comprises multiple modules, wherein said multiple modules are synchronized to emulate multiple windows in a room;
- wherein each of said multiple modules is configurable to specify the orientation of the module, thereby facilitating independent control of each module according to its orientation, wherein said modules having different orientation vary in color and/or intensity.

* * * * *